(12) United States Patent
Pauly et al.

(10) Patent No.: US 8,965,300 B2
(45) Date of Patent: Feb. 24, 2015

(54) METHOD FOR TESTING TRANSMISSION MODES OF A WIRELESS COMMUNICATION DEVICE

(71) Applicant: Rohde & Schwarz GmbH & Co. KG, Munich (DE)

(72) Inventors: Andreas Pauly, Munich (DE); Juergen Schlienz, Poing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/137,211

(22) Filed: Dec. 20, 2013

(65) Prior Publication Data

US 2014/0113570 A1   Apr. 24, 2014

Related U.S. Application Data

(62) Division of application No. 12/918,585, filed as application No. PCT/EP2009/002080 on Mar. 20, 2009, now Pat. No. 8,620,222.

(30) Foreign Application Priority Data

Apr. 15, 2008  (DE) .......................... 10 2008 018 807
Aug. 8, 2008  (DE) .......................... 10 2008 037 132

(51) Int. Cl.
*H04B 17/00* (2006.01)
*H04W 24/08* (2009.01)
*H04L 1/00* (2006.01)
*H04L 1/24* (2006.01)

(52) U.S. Cl.
CPC ............. *H04W 24/08* (2013.01); *H04L 1/0001* (2013.01); *H04L 1/24* (2013.01)

USPC ..................... 455/67.11; 455/67.13; 455/501; 455/506; 375/224; 375/346; 375/348

(58) Field of Classification Search
CPC ........................................................ H04L 1/24
See application file for complete search history.

(56) References Cited

U.S. PATENT DOCUMENTS

2007/0019769 A1*   1/2007   Green et al. .................. 375/360

* cited by examiner

*Primary Examiner* — Hsin-Chun Liao
(74) *Attorney, Agent, or Firm* — Ditthavong & Steiner, P.C.

(57) ABSTRACT

A method for testing transmission modes of a wireless communication device. According to the method, a switching range is determined in a parameter space in a test device. The parameter of the parameter space describes the quality of transmission and influences a recommendation for a transmission mode to be adjusted in a device to be tested. The switching range is a subspace of the parameter space and contains at least one switching limit for the recommendation for the subsequent transmission mode to be adjusted. In a further step, random parameter points from the switching range are generated depending on a probability distribution which is defined for the switching range. A signal is generated for every parameter point and has a transmission mode determined by the parameter point and is transmitted to the device to be tested. The device to be tested then transmits one response signal per received signal to the test device, the response signal containing a recommendation for a subsequent transmission mode to be adjusted. All recommendations from all received response signals are evaluated in the test device.

10 Claims, 8 Drawing Sheets

METHOD FOR TESTING TRANSMISSION MODES OF A WIRELESS COMMUNICATION DEVICE

CROSS-REFERENCE TO RELATED APPLICATION

The present application is a Division of U.S. application Ser. No. 12/918,585 filed Aug. 20, 2010, which is a national phase application of PCT Application No. PCT/EP2009/002080, filed on Mar. 20, 2009, and claims priority to German Application No. 10 2008 037 132.7, filed on Aug. 8, 2008, and German Application No. 10 2008 018 807.7, filed on Apr. 15, 2008, the entire contents of which are herein incorporated by reference.

BACKGROUND OF THE INVENTION

1. Field of the Invention

The invention relates to a method for testing the transmission states of a device for wireless communication in a radio network.

2. Discussion of the Background

Digital mobile radio devices and also other devices for wireless communication are becoming ever more complex and increasingly have at their disposal transmission parameters which can be adapted to the transmission quality and which enable a plurality of transmission states merely by reason of practical combinations thereof. Examples of such transmission parameters of the transmission signal are power, modulation type, various types of multiplexing, the use of various antennas in Multiple Input Multiple Output (MIMO) systems etc. The transmission quality describes the quality of the physical transmission on the transmission path. The transmission state which is to be adjusted is selected by means of an item or items of decision information, e.g. of a measured transmission quality, which is/are transmitted by the mobile radio device. New transmission standards allow a mobile telephone to transmit a recommendation for a transmission state, which is to be adjusted, to the base station which is able to accept or reject this recommendation according to the capacity utilization thereof.

For the development of devices which in all operating situations adjust or recommend the correct transmission state, it is very useful to examine the switching procedures between two transmission states. However, classic testing methods test only the transmission rate in dependence upon the transmission quality, in that the transmission rate is measured at a constantly improved transmission quality, as illustrated in FIG. 1. The prior art testing methods are characterized by various functions of the transmission quality over time, in order to simulate fluctuations in channel quality, as occur in reality. Therefore, e.g. fading oscillations are simulated in the German patent specification DE 100 25 838 B4 by a Monte Carlo method.

Classic tests of this kind do not enable the developer to gain any knowledge relating to the switching procedures, i.e. the decision relating to the transmission state of the mobile radio device to be tested.

Not only are the switching points not known, they are also not clearly defined. The decision relating to the switch between two transmission states includes a hysteresis effect, in order to prevent the transmission state from changing constantly at the switching point and in proximity thereto.

In addition, there are still no testing methods which test mobile radio devices of modern transmission standards which provide recommendations of a transmission state to the base station. An examination of the switching points between suggestions of various transmission states is therefore of particular interest for the development of this new generation of mobile radio devices.

Similar problems occur during the testing of base stations which decide the transmission state, which is to be adjusted, on the basis of return values of the mobile radio device and thus produce switching procedures. Classic return values thus specify the transmission quality, whereas in more recent transmission standards such as e.g. WiMAX (Worldwide Interoperability for Microwave Access) recommendations of a transmission state, which is to be adjusted, are also transmitted as return values to the base station. In this application, return values are defined as the decision information which is transmitted by a mobile radio unit to a base station and which is relevant for the decision of the base station for a transmission state to be adjusted subsequently.

SUMMARY OF THE INVENTION

Embodiments of the invention solve the above-described problems of the prior art and to provide an improved testing method.

The method in accordance with the invention initially establishes a switching range in a parameter space in a test device. The parameter(s) of the parameter space describe(s) the quality of the transmission and influence(s) a recommendation of a transmission state, which is to be adjusted, in a device to be tested. The switching range is a subspace of this parameter space which contains at least one switching limit for the recommendation of the transmission state to be adjusted subsequently. In a further step of the method, random parameter points from the switching range are generated according to a probability distribution defined on the switching range. A signal is generated for each parameter point, said signal having a transmission quality determined by the parameter point and being transmitted to the device to be tested. The device to be tested then transmits one response signal per received signal to the test device, wherein the response signal includes a recommendation of a transmission state to be adjusted subsequently. The recommendations from the received response signals are then evaluated in the test device.

An alternative usage of the testing method in accordance with the invention initially establishes a switching range in a parameter space in a test device. The parameters of the parameter space describe the quality of the transmission and influence a transmission state, which is to be adjusted, in a device to be tested. The switching range is a subspace of this parameter space which contains at least one switching limit for the transmission state to be adjusted. In a further step of the method, random parameter points from the switching range are generated according to a probability distribution defined on the switching range. Each parameter point is transmitted in a respective signal to the device to be tested. The device to be tested then transmits one response signal per received signal to the test device, wherein the response signal includes a transmission state to be adjusted. The transmission states, which are to be adjusted, are then evaluated from the received response signals in the test device.

The subordinate claims relate to advantageous developments of the invention.

It is advantageous inter alia to establish several switching ranges and to analyze them in each case according to one of the two testing methods.

It is also advantageous to use a Gauss distribution for the probability distribution defined on a switching range, if the parameter space is one-dimensional and, in the case of a multi-dimensional parameter space, to select a distribution which is Gauss-distributed in the direction orthogonal to the switching limit and which is uniformly distributed in the remaining transient directions.

In addition, it is advantageous to statistically evaluate the transmission states which are to be adjusted and are transmitted by the response signal, or the recommendations thereof. In doing so, the number of generated parameter points determines the resolution of the statistical evaluation.

It is particularly advantageous to establish the switching ranges to be of such a size that in the case of several parameters of the switching procedure hysteresis effects and directionalities are averaged out between two transmission states in the statistical evaluation.

The described method for testing recommendations of transmission states which are to be adjusted is particularly suitable for mobile radio devices, in particular for those mobile radio devices which use the transmission standard of the WiMAX Forum and transmit a recommendation for using Space Time Coding or Spatial Multiplexing to the base station.

The method for testing recommendations of transmission states which are to be adjusted can also be improved in that, in addition to the quality of the transmission, the parameter space describes a transmissions state and the individual signals are transmitted to the individual signals [sic] to the device, which is to be tested, in the transmission state which has been defined by the corresponding randomly generated parameter point. This is practical especially when the device to be tested takes into account the currently adjusted transmission state in the selection of a recommendation of a transmission state to be adjusted subsequently.

In the alternative use of the method for testing transmission states to be adjusted, it is advantageous if the parameter space contains a recommendation of a transmission state in addition to the quality of the transmission.

The invention of this application will be described with reference to a mobile radio device and base station as examples of devices for wireless communication in radio networks. However, the application is not limited to the testing of devices of mobile radio but is suitable for testing all devices for wireless communication which can transmit and receive in various transmission states and form part of a radio network having at least one central device and at least one peripheral device. The central device, i.e. the base station in mobile radio communication, has the decision authority in relation to the transmission state to be adjusted. The peripheral device, i.e. the mobile radio device in mobile radio communication, influences the transmission state, which is to be adjusted, merely by the return values which are transmitted to the central device.

BRIEF DESCRIPTION OF THE DRAWINGS

Two possible exemplified embodiments will be described in detail hereinafter with reference to the drawing, in which.

DETAILED DESCRIPTION OF EXEMPLARY EMBODIMENTS OF THE INVENTION

Figure 1:
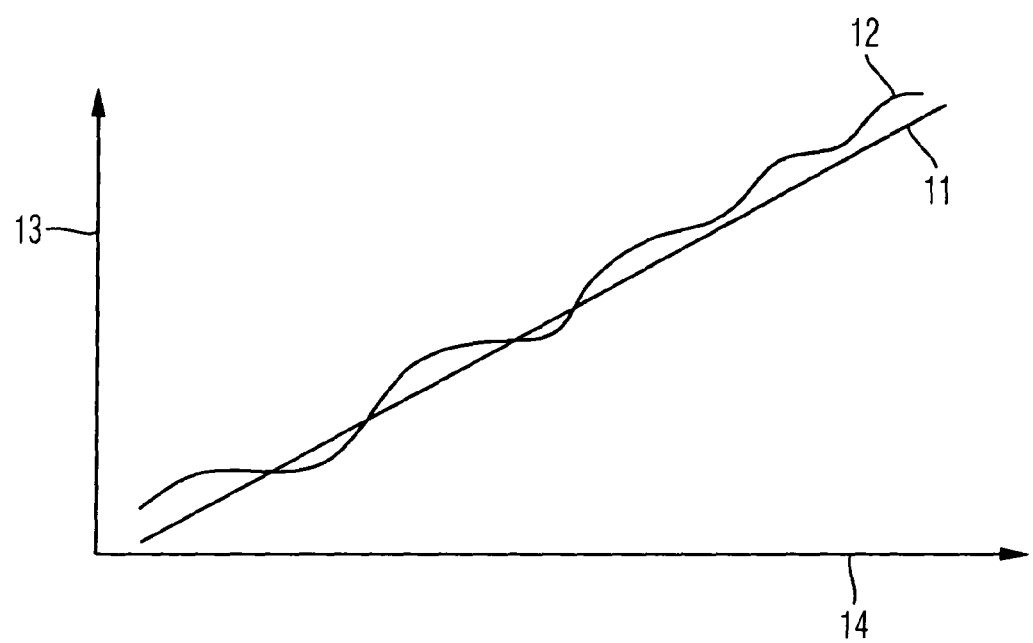
FIG. 1 shows the prior art for the indirect testing of the switching procedures by measuring the data rate as a function of the transmission quality.

FIG. 1 illustrates a prior art testing method in mobile radio communication which measures the switching procedures only indirectly via the data rate. The data rate is plotted on the y-axis 13 as a function of the transmission quality on the x-axis 14. The testing method measures the data rate 12 of a mobile radio device as the signal quality increases. In the event of reliably functioning transmission state adaptations, the measured data rate 12 should be above a specified data rate 11 per transmission quality. However, testing methods of this type do not provide any information relating to the individual switching procedures, such as e.g. the transmission quality at which they take place.

Figure 2:
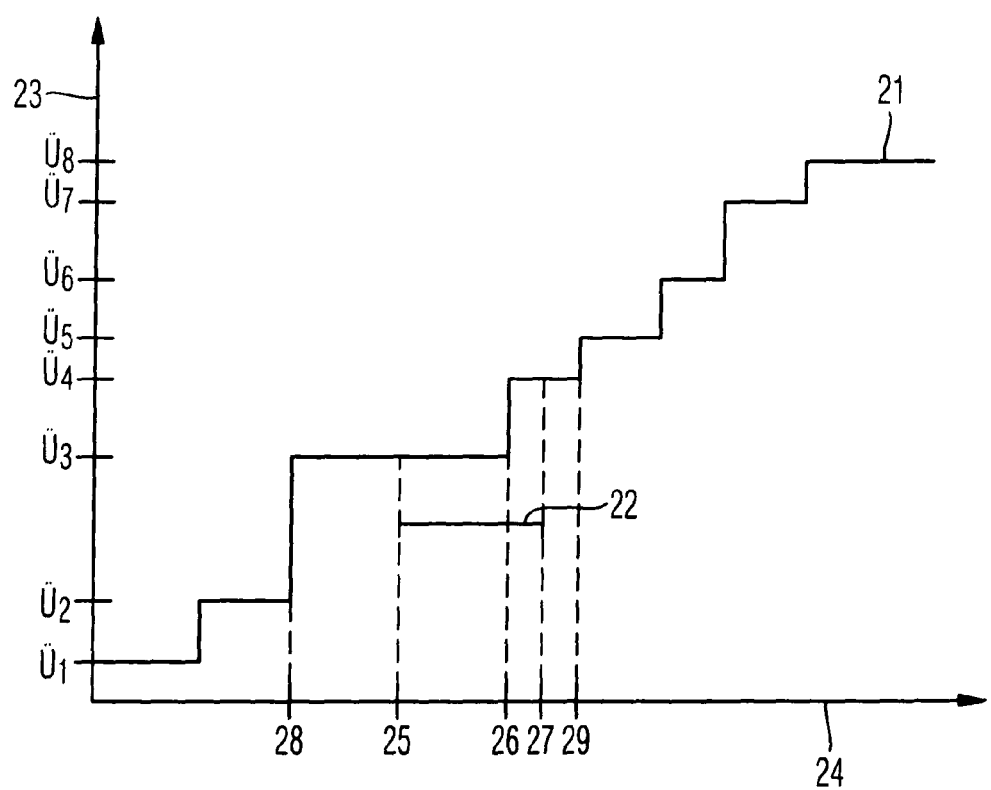
FIG. 2 shows a switching range in accordance with the invention in the discrete transmission states as a function of the transmission quality.

The diagram in FIG. 2 illustrates transmission states $Ü_1$-$Ü_8$ on the y-axis 23 and the transmission quality on the x-axis 24. The transmissions states $Ü_1$-$Ü_8$ which are selected by the base station on the basis of return values of a mobile radio device can contain both discrete and also continuous transmission parameters. Examples of discrete transmission parameters include the modulation types used, such as Quadratic Phase Shift Keying (QPSK) or Quadratic Amplitude Modulation (QAM), the coding used, such as Space Time Coding (STC) or Spatial Multiplexing (SM), or the use of various frequencies with Orthogonal Frequency Division Multiplexing (OFDM). The power of the transmission signal is a continuous transmission parameter which in the technical implementation, however, is also changed in discrete steps. The list of the possible and practical combinations of various transmission parameters is stored in a so-called Code Book which lists all of the transmission states which are permitted by the transmission standard, such as e.g. $Ü_1$-$Ü_8$, as so-called Code Book entries.

In this case, the transmission quality is one-dimensional and can be described e.g. by one of the following variables: a Signal to Noise Ratio (SNR), a Signal to Noise plus Interference Ratio (SNIR), a Channel Quality Identifier (CQI), a Block Error Rate (BLER) or a Packet Error Rate (PER). A higher-dimensional transmission quality can additionally include interferences, various Power Delay Profiles (PDP) and/or other information relating to the physical quality of the transmission signal.

In FIG. 2, the Code Book entries are plotted as transmission states 21 which are specified as a function of the transmission quality by the base station. In this case, a switching point 26 between two Code Book entries is illustrated by way of example for a transition between the transmissions states $Ü_3$ and $Ü_4$. If the transmission quality becomes only one-dimensional on account of the return values of the mobile telephone, e.g. as measured by an SNR, then point 26 is a switching point. If the decision between two Code Book entries takes place in the base station on the basis of n return values, then this relates to a switching limit which forms an n−1-dimensional hyper plane in the n-dimensional space of the return values. By virtue of this switching limit, each combination of the return values is unequivocally allocated in each situation to one of the two Code Book entries which are separated by the switching limit. The terms switching point and switching limit will be used hereinafter depending upon the situation. However, the term switching point does not limit the invention to only one return value.

However, a switching point 26 between two Code Book entries is not always unequivocally defined. Therefore, by means of a hysteresis the base station, for example, prevents constant switching back and forth between the two adjacent Code Book entries $Ü_3$ and $Ü_4$, if the transmission quality corresponds precisely to the switching point 26 or fluctuates around it. Two adjacent Code Book entries are those transmission states, to which intervals in the transmission quality are allocated in each case by virtue of decision rules of the base station, said intervals in turn being adjacent to one another. Such hysteresis effects ensure that, e.g. in the event of a deterioration in the transmission quality, the next more stable Code Book entry is only selected if said transmission quality is below a second threshold in the transmission quality which is less than the transmission quality at the switching point 26. In the opposite direction, the same applies to an improvement in the transmission quality.

In order then to examine the decision processes at a switching point 26 or in the vicinity thereof, a so-called Monte Carlo approach is employed. Instead of using a deterministically established testing method, a switching range 22 is established as an interval in the transmission quality around a switching point 26. The interval limits are designated in FIG. 2 by the reference numerals 25 and 27 and can preferably be symmetrical in relation to the switching point 26. By virtue of the random selection of points in this switching range 22, i.e. of transmission qualities and by virtue of the consecutive transmission of signals with the randomly generated transmission qualities as return values of a mobile radio device to a base station, it is then possible by communicating the decisions of the base station which in turn are sent back to a test device, to make a statistical statement relating to the switching point 26.

Novel transmission standards enable mobile radio devices to recommend to the base station a transmission state which is to be adjusted. The WiMAX Forum has defined a standard, in which the mobile telephone recommends to the base station the use of Space Time Coding (STC) or alternatively Spatial Multiplexing (SM). The mobile radio device thus also has at its disposal a decision routine which is subjected to the same problems as that of the base station and should be tested in the development of mobile telephones. The above-described method for testing the switching points in the base station can correspondingly also be used for testing the switching point between STC and SM in the mobile telephone in the case of WiMAX.

Figure 3:
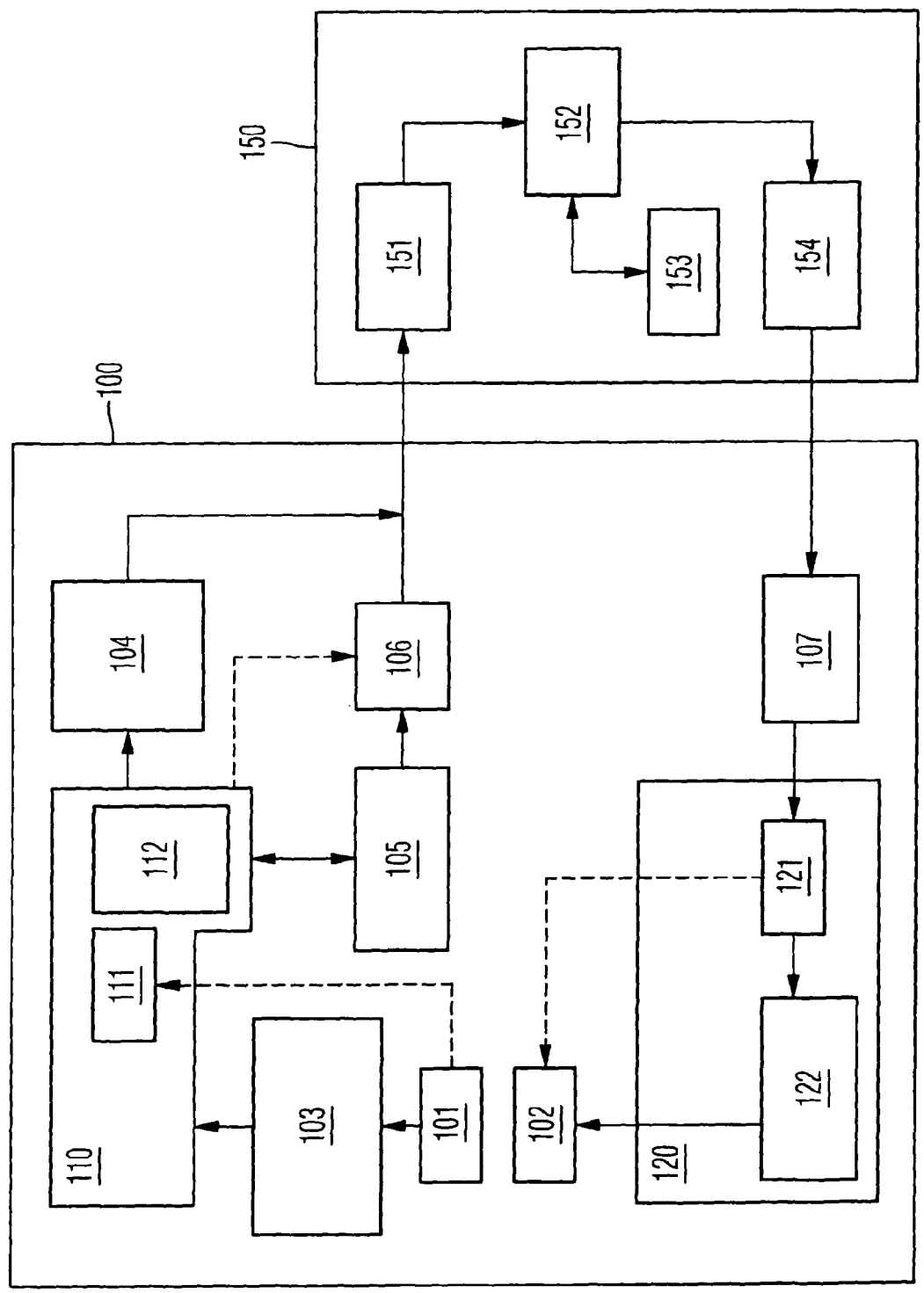
FIG. 3 shows the circuit diagram of a possible exemplified embodiment of a test device which employs the method in accordance with the invention.
Figure 4A:
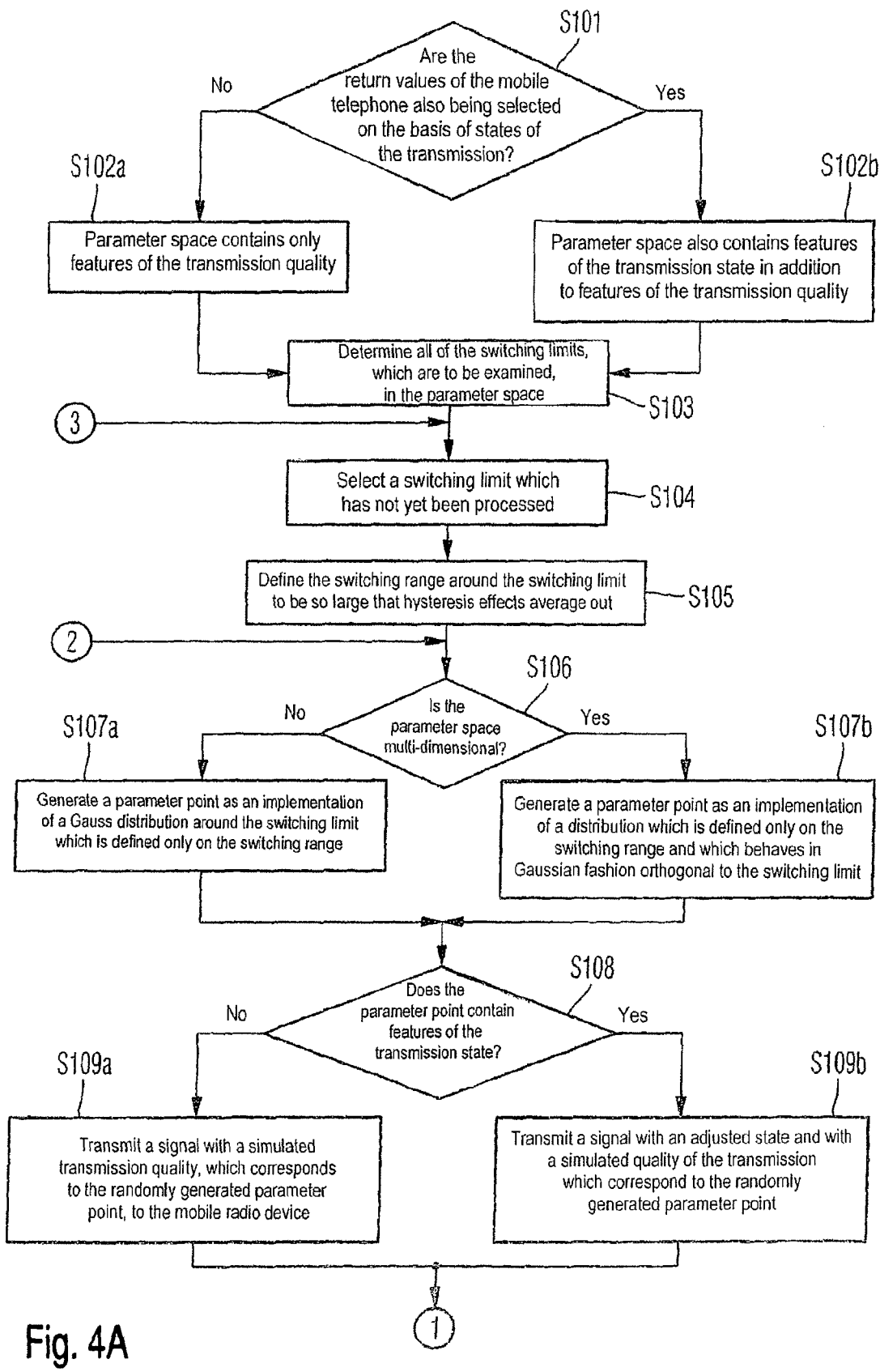
FIG. 4A shows the first part of a diagram of the method steps of an exemplified embodiment in accordance with the invention.
Figure 4B:
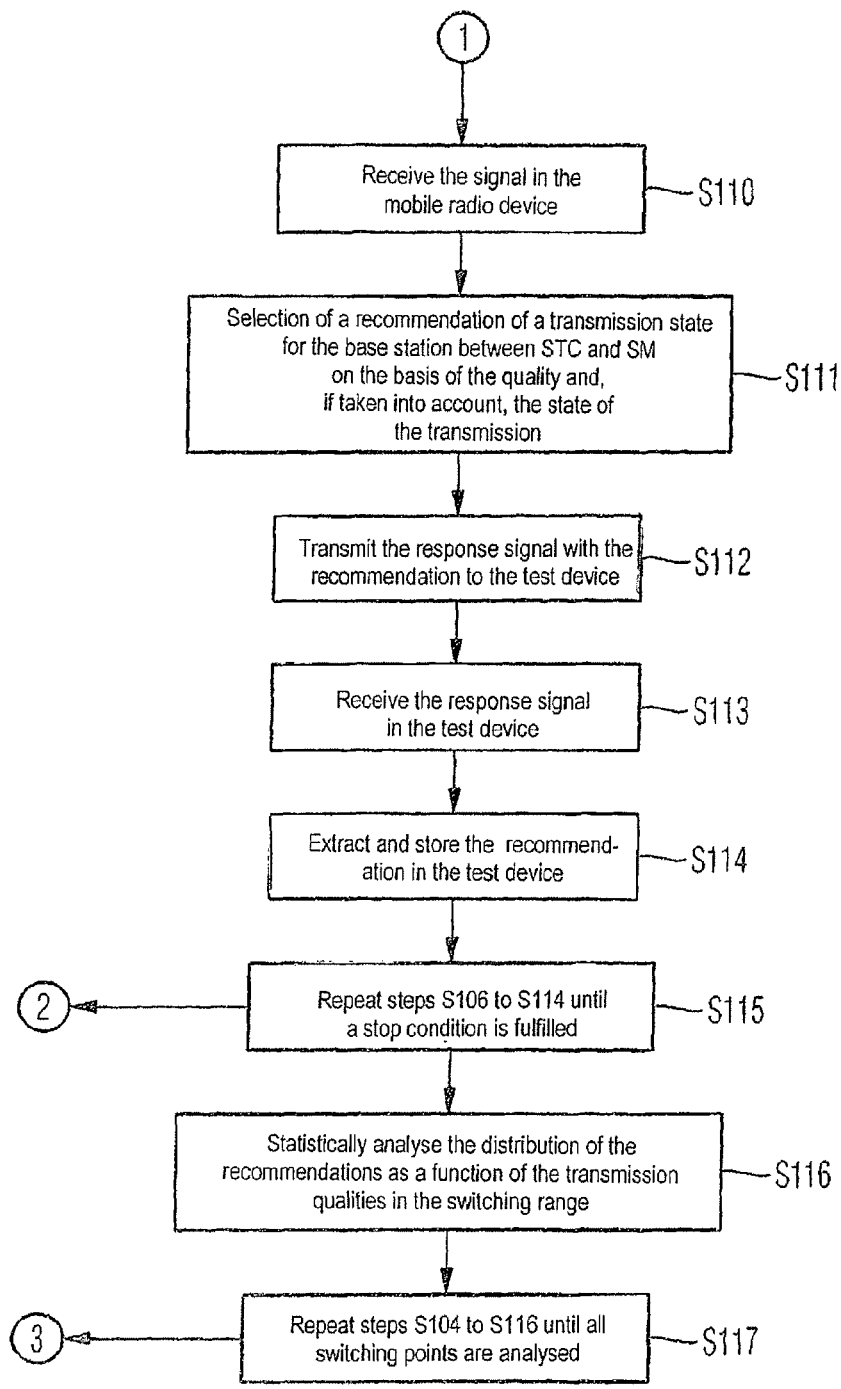
FIG. 4B shows the second part of a diagram of the method steps of an exemplified embodiment in accordance with the invention.

FIG. 3 illustrates a block diagram of a test device 100 for testing a mobile radio device of the transmission standard of the WiMAX Forum which utilizes the method in accordance with the invention. FIG. 4 illustrates the individual steps of the method in accordance with the invention. The method is described with reference to FIGS. 3 and 4.

The user of the test device 100 can control the device by means of an input device 101, e.g. a mouse, a keyboard, a touch screen or a simple interface and an output device 102, e.g. a monitor, a display panel or an interface. The user can establish in step S101 which parameters are used in this testing method as a basis and are varied statistically. If the decision of the mobile radio device between STM and SM is only based upon one or several features of the transmission quality, e.g. the SNR, then in step S102*a* a parameter space is defined which describes this feature or these features. However, if for the purpose of its decision the mobile radio device takes into account further features, e.g. of the transmission state, then these can also be incorporated into the parameter space in step S102*b*. This can be input by the user before each test using the input device 101.

In step S103, the user is able to use the input device to define additionally determined test scenarios or to select from predefined test scenarios which determine the switching limits to be examined. One possible test scenario would be to examine precisely one switching point. In so doing, the user can select a switching limit of interest to him, e.g. 26. The adjustments hitherto made by the user can naturally also be performed automatically. Therefore, small preliminary tests with low resolution can establish the approximate position of the switching limits or the decision basis, upon which the mobile telephone operates. The decision as to which switching limit is to be analyzed can be selected randomly or all switching limits are examined e.g. by the sequential examination of the individual limits.

In step S104, the testing method selects one of the switching limits which is not yet analyzed but is to be examined. In the test scenario selected in this case, it is the switching limit 26 which is to be examined The information relating to the selected switching point 26 to be examined and relating to the selected parameter space is transmitted by the input device 101 to the definition device 103. In step S105, the definition device 103 establishes a switching range 22 which contains the switching point 26 which is to be examined. The interval in the transmission quality as a switching range 22 in the event of a one-dimensional parameter space can be established by the user by means of the input device 101 or can possibly be defined automatically, e.g. as an interval which starts from the transmission quality 25 which is situated in the center 25 between the switching point 28 with respect to the next more stable transmission state $Ü_2$ and the switching point 26 to be examined, and ends with the transmission quality 27 which is situated in the center 27 between the switching point 29 which switches to a transmission state $Ü_5$ with the next higher data rate, and the switching point 26 to be examined. The switching range 22 should be selected to be so large that hysteresis effects are averaged out to the switching point 26 in the subsequent evaluation.

If the parameter space is multi-dimensional, e.g. n-dimensional, then the switching range is also an n-dimensional subspace of the parameter space. Correspondingly, the switching range does not contain a switching point but rather a n−1-dimensional switching limit. A two-dimensional parameter space thus contains a limit line, a three-dimensional parameter space contains a limit surface, etc.

The information relating to the established switching range 22 in the parameter space is transmitted to the parameter generator 110 which includes a memory 111 which contains one or several directives for defining a probability distribution on a switching range, e.g. 22. In the one-dimensional parameter space (S106), this directive could provide a Gauss distribution with the switching point, in this case 26, as an average value and a fixed variance, as performed in step S107a of the testing method. The variance can naturally also be established relative to the magnitude of the switching range or by the user by means of the input device 101. In the case of an n-dimensional parameter space (S106), it would be e.g. practical to define the distribution in such a manner that the probability is at its maximum in the vicinity of and at the switching limit and continues to reduce the greater the distance is from the switching limit, as provided in step S107b. This is practical primarily with regard to the problem of filling a higher-dimensional space with points, as the analyzed range within the switching range is limited to the closest surrounding area of the switching limit. This could be solved by a preferred distribution which behaves in Gaussian fashion in the direction orthogonal to the switching limit and is uniformly distributed in the remaining transient directions. In accordance with these directives or even in accordance with a specification by the user, a probability density is then defined on the switching range 22. Depending upon the examination objective, other distributions, such as Cauchy distribution, uniform distribution or a distribution at a discrete parameter space, e.g. a binomial distribution, can naturally also be employed. A pseudo-random number generator 112 then generates an implementation of a parameter point based upon the defined probability density in the switching range 22. In step S107a or S107b, the implementation provides a random parameter point in the switching range, which in the simplest case can include a transmission quality in the switching range 22 or even the transmission state, in this case $\ddot{U}_3$ or $\ddot{U}_4$.

After generation of the parameter point, data are generated in the data generator 105 corresponding to the utilised transmission standard and transmission state. The signal can contain randomly generated data with Cyclic Redundancy Check (CRC) values and/or pilot signals which are used for determining the transmission quality in the mobile radio device. It is important that the requirements of the transmission standard are observed and above all those which enable the mobile radio device 150 to determine the transmission quality and to ascertain the adjusted transmission state. The signal is sent to a transmitting device 106 which modulates the data according to a transmission state, which is to be adjusted, to a digital high frequency signal. Step S108 establishes whether the parameter point also describes a transmission state or parts thereof. If this is the case, the parameter point is transmitted from the parameter generator 110 to the transmitting device 106, in order to adjust the transmission state accordingly in step S109b.

Both in step S109a and also in step S109b, the parameter point is transmitted from the parameter generator 110 to a quality simulator 104 which simulates the transmission quality according to the parameter point. In so doing, the quality simulator 104 simulates in step S109a or S109b the transmission signal output by the transmitting device 106 such that the quality defined by the parameter point is achieved. This is achieved e.g. by adding noise, by distorting or damping the signal or by simulating PDPs. Various operating situations can also be simulated. A real user of the mobile telephone 150 can be moving very quickly e.g. in a car and thus generate rapid quality changes of the signal, or could be on foot in a very stationary surrounding field. In step S109a or S109b, the transmission signal is transmitted with the simulated transmission quality to the mobile radio device 150 as a device which is to be tested.

The mobile radio device 150 receives the transmitted signal in step S110 in a receiving device 151. The receiving device 151 knows or recognizes the adjusted transmission state, e.g. $\ddot{U}_3$ or $\ddot{U}_4$, and demodulates the transmitted data of the high frequency signal accordingly. By virtue of pilot signals or CRC values it is possible to identify transmission errors and a variable such as SNR or BLER which describes the transmission quality can be calculated. This variable is or, in the event that several transmission quality variables are taken into account, these variables are transmitted to a decision device 152 as a decision basis. If the mobile radio device 150 also takes the currently adjusted transmission state into account, then this transmission state is likewise transmitted to the decision device as an additional decision basis. On the basis of the decision basis and the decision rules 153 stored in the mobile radio device 150 the decision device 152 decides in step S111 whether STC or SM is to be utilized subsequently as transmission coding. In step S112 this information is sent back as a return value in a response signal via the transmitting device 154 as a recommendation to the test device 100. The transmitting device 154 modulates this information to a response signal in the same way as the transmitting device 106 modulates the transmission data to the high frequency signal which is to be transmitted. In step S114, the receiving device 107 demodulates and digitizes in the test device 100 the return values transmitted in the response signal. These return values normally serve the base station as a decision basis for the transmission state to be actually adjusted subsequently, e.g. $\ddot{U}_1$-$\ddot{U}_8$. However, the decision between STC and SM made in the mobile radio device 150 serves merely as a recommendation for the base station. In step S114, this recommendation which is sent with the return values is likewise stored in a memory 121. The recommendation is stored together with the parameter point which produces this recommendation. For this purpose, the parameter point is supplied by the parameter generator 110 to the memory 121 in the evaluating device 120. In the actual decision by the base station, further boundary conditions such as available capacity must also be taken jointly into account.

In step S115, the steps S106 to S114 are then repeated until a stop criterion interrupts this loop. In other words, in each repetition a new random parameter point is produced in the parameter generator 110 corresponding to the previously defined probability density. A signal is generated by means of the transmitting device 106 corresponding to the generated parameter point and is transmitted to the mobile radio device 150 with a simulated transmission quality which is established by the generated parameter point. Based upon the new transmission signal, the mobile radio device 150 once again selects a recommendation for the base station and transmits it back to the test device 100. The recommendation is added together with the associated parameter point to the recommendations already stored in the memory 121 and the loop begins anew until a stop criterion is fulfilled.

A stop criterion can consist of a maximum number of repetitions of the loop. The number can be established e.g. by the user. The number of analyzed parameter points also establishes at the end the resolution of the statistical evaluation. It should be noted that an n-dimensional parameter space having $N^n$ points has the same resolution, i.e. average distance between two points in the parameter space, as a one-dimensional parameter space having N points. This must be taken into account in the selection of the repetitions.

An alternative stop criterion would be to test after each repetition whether a result still changes or still changes outside a permitted limit value. However, this requires an evaluation of this result after each repetition or e.g. after each $10^{th}$ repetition. On the other hand, this stop criterion offers an optimum between desired quality of the results and a short test time, as the number of repetitions is directly proportional to the test time.

If the stop criterion is fulfilled in step S115, the statistical distribution of the recommendations is evaluated in step S116 as a function of the parameter points which contain features of the transmission quality and possibly of the transmission state. To this end, the stored recommendations are transmitted together with their associated parameter points to the statistical evaluating device 122 in the evaluating device 120 where they are evaluated. The results are transmitted to the output device 102 where they are output. This can be a display screen which shows a graphical representation of the evaluation or the characteristic variables of the statistical evaluation, such as the position of the switching point and its variance, if it relates to a one-dimensional parameter space. Alternatively, the raw data consisting of recommendations and their parameter points can also be sent via an interface to an external computer where they are individually evaluated.

If the evaluation of the selected switching point 26 is completed, steps S104 to S116 are repeated in step S117 until all relevant switching points are examined and evaluated. It is possible to combine the individual examination results of the individual switching ranges in an evaluation located downstream.

Figure 5A:
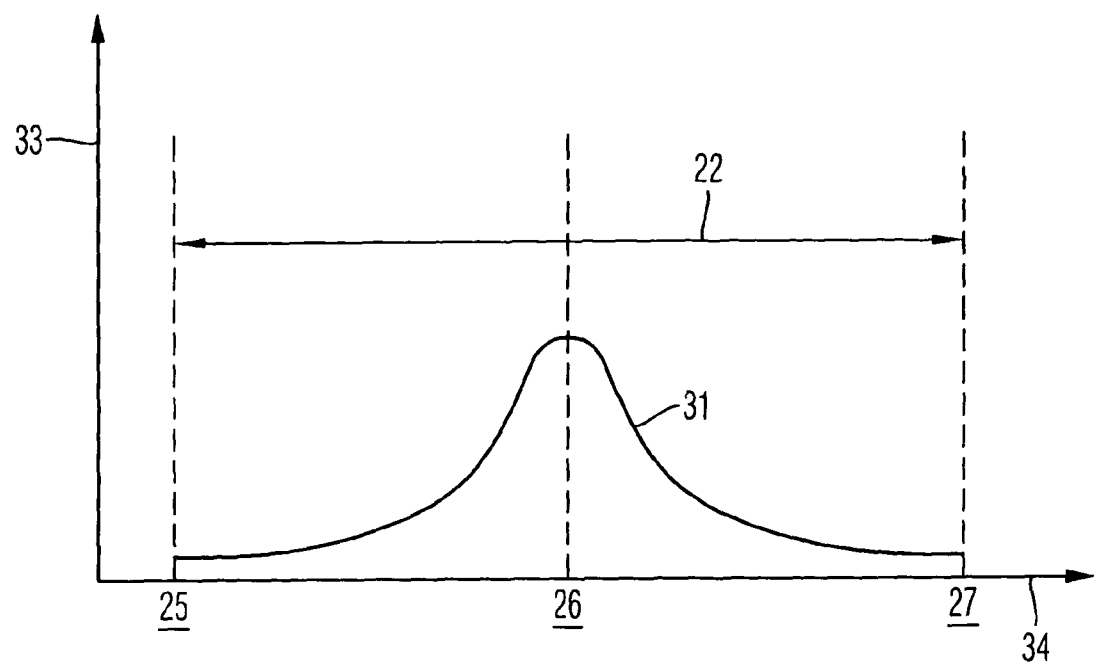
FIG. 5A illustrates a possible graphical representation of a probability distribution.

FIG. 5A illustrates the probability distribution which has been defined on the switching range. On the x-axis 34 the transmission quality is plotted as a parameter and plotted on the y-axis 33 is the probability of generating this parameter point or transmission quality in the parameter generator 110. The switching range 22 is established by the interval of 25 to 27. The parameter point 26 illustrates in this case the switching point or the switching point presumed at this location. A Gauss distribution 31 is proposed as a standard distribution of the pseudo-random generator 112 which is defined only within the switching range 22 and has the average value in the case of the switching point 26. The Gauss distribution should reflect the previous knowledge relating to the switching point 26. If the position is very precisely known, the variance of the distribution can be selected to be small. If the position of the switching point is presumed to be only at 26, then a variance which is as large as possible should be selected. If nothing is known about the position of the switching point 26, a uniform distribution is also feasible.

Figure 5B:
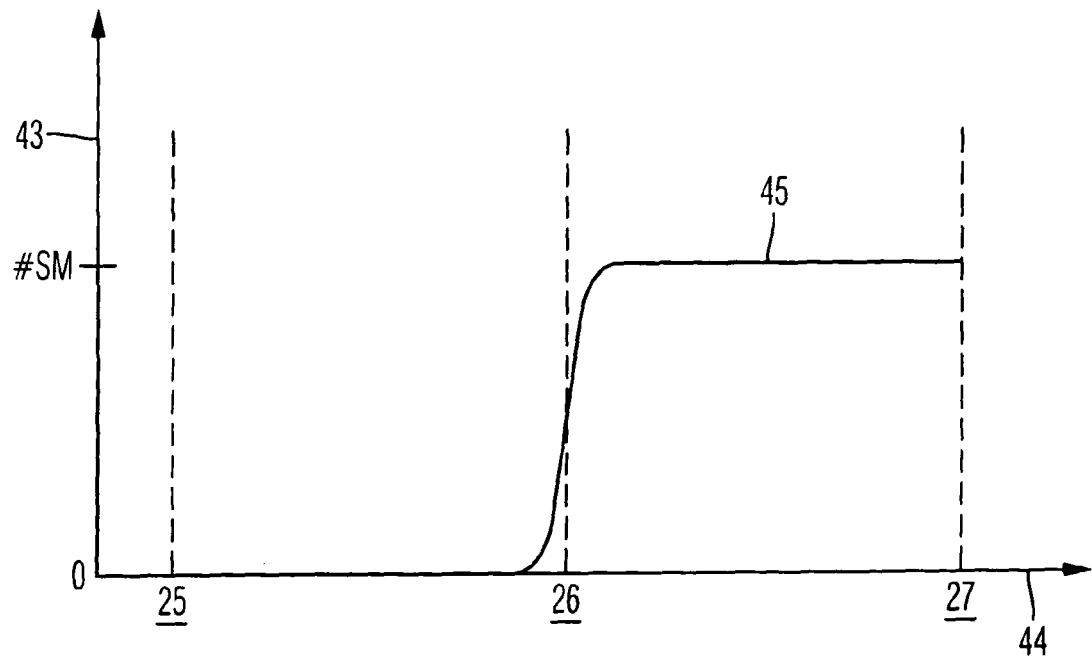
FIG. 5B illustrates a possible graphical representation of a statistical evaluation.

FIG. 5B illustrates a possible graphical representation of a statistical evaluation of the switching range 22 with the probability distribution 31 defined in FIG. 5A. The x-axis 44 represents in this case as in FIG. 5A the transmission quality and the y-axis shows the cumulative number of recommendations of the mobile radio device for SM. The point #SM is the total number of recommendations for SM. The curve 45 in the case of a specific transmission quality shows the number of decisions for SM in the interval 25 up to the specific transmission quality. In this case, the result would confirm the position of the switching point 26. The steepness of the edge in the switching point provides a statement about the accuracy of the position of the switching point.

An alternative use of the method in accordance with the invention resides in the field of testing the decisions of the transmission states, which are to be adjusted, in base stations on the bases of return values of a mobile telephone. A mobile telephone is emulated to test a base station which is to be examined.

Figure 6:
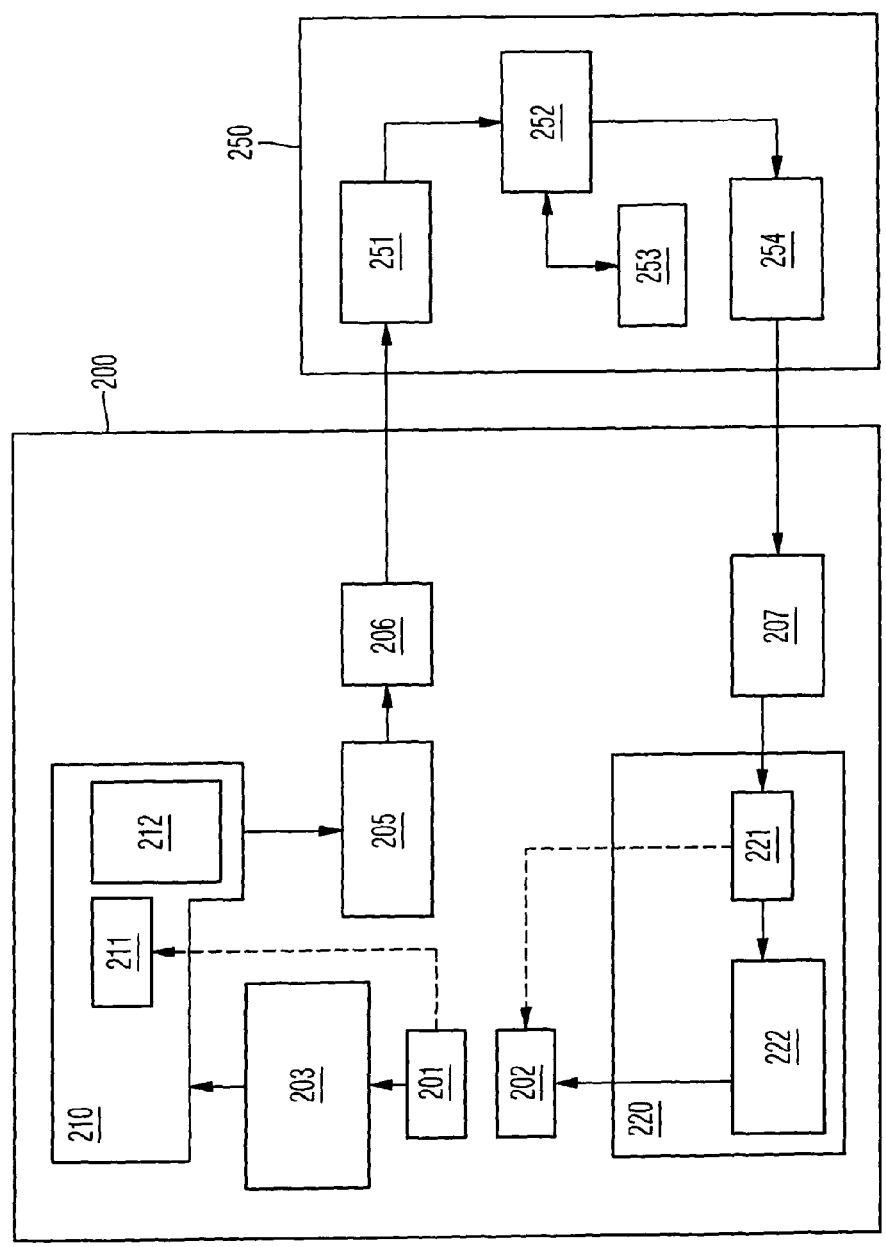
FIG. 6 shows a circuit diagram of an alternative exemplified embodiment of a test device which employs the method in accordance with the invention.
Figure 7A:
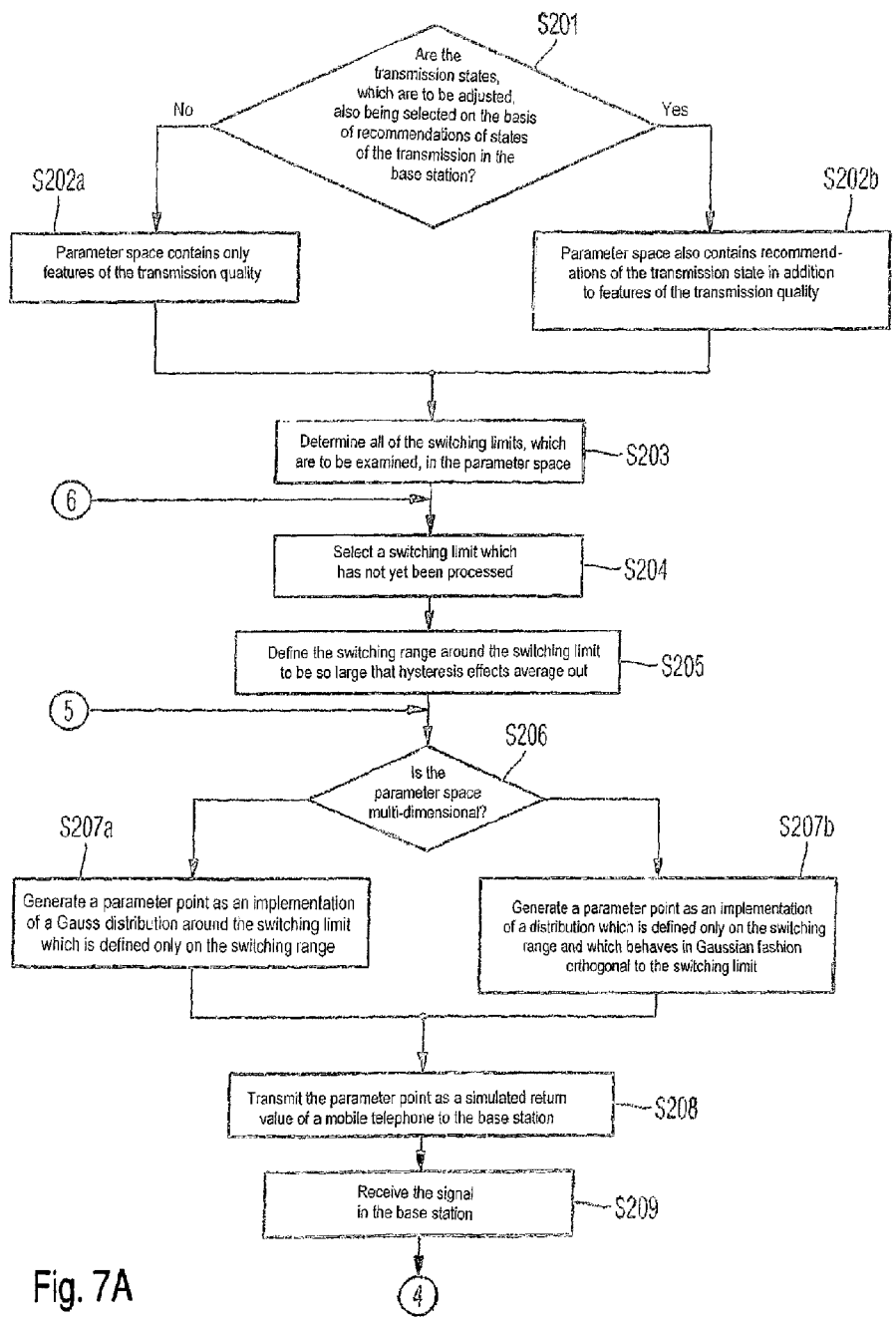
FIG. 7A shows the first part of a diagram of the method steps of an alternative exemplified embodiment in accordance with the invention.
Figure 7B:
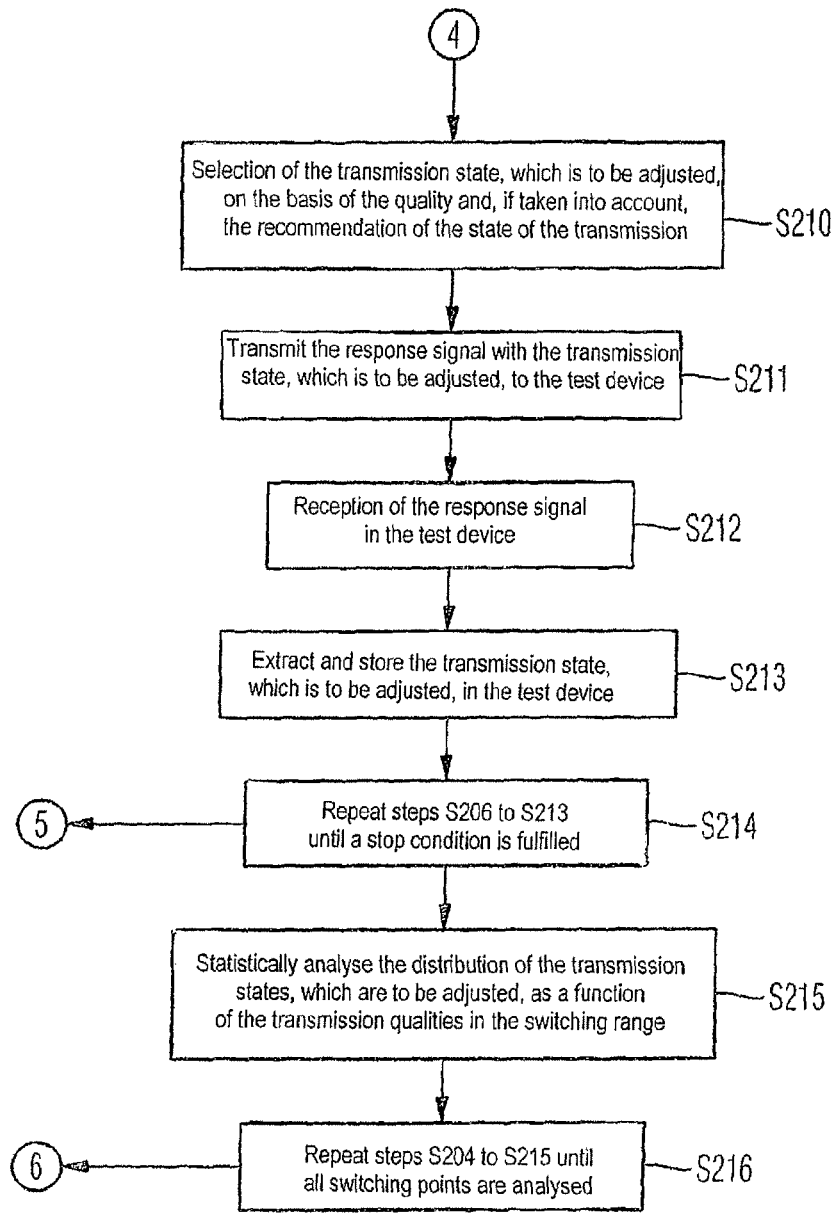
FIG. 7B shows the second part of a diagram of the method steps of an alternative exemplified embodiment in accordance with the invention.

FIG. 6 illustrates a circuit diagram of a test device which employs the method in accordance with the invention for the purpose of testing base stations. FIGS. 7A and 7B illustrate the method steps in accordance with the invention. The method will be described hereinafter with reference to FIGS. 6, 7A and 7B.

The user of the test device 200 can control the device in a similar manner to the test device 100 by means of an input device 201 and an output device 202. In step S201 the user is able to establish which parameters in this testing method serve as a basis and are statistically varied. Is the decision of the base station 250 also based upon recommendations of transmission states, such as e.g. STM or SM in the case of WiMAX, which a mobile radio device transmits (S201) in the form of return values to the base station 250? If this is not the case, then in step S202a a parameter space is defined which describes all of the return values relevant to the decision. In the normal case, they are variables of the transmission quality, as described above. If the base station 250 also takes recommendations of transmission states of a mobile radio device into account, then the possible recommendations are additionally incorporated into the parameter space in step S202b. Since the decision basis is based upon the return values transmitted back from the mobile radio device, the decision basis is limited by the transmission standard. Accordingly, the selection of the correct parameter space could also be simplified by the selection of the correct transmission standard instead of the individual parameters.

As also already stated for the test device 100, in step S203 preferably all of the switching limits which are to be examined are determined. In step S204 a hitherto unexamined switching limit, e.g. 26, is selected and is transmitted together with the defined parameter space to the definition device 203. As already described in step S105, a switching range, e.g. 22, is defined in step S205 in the definition device 203, said switching range containing the switching point or the switching limit. The switching range 22 of the switching point 26 will be examined hereinafter without limiting the invention.

The defined switching range 22 is transmitted to the parameter generator 210 which in the pseudo-random number generator 212 generates random parameter points from the switching range 22. For this purpose, in a similar manner to steps S106, S107a, S107b, a probability density is defined on the switching range 22 in steps S206, S207a, S207b, which probability density or its construction rules is/are stored in the memory 211.

The randomly generated parameter point corresponds to one of the possible return values or a possible set of return values of a mobile telephone. The return values are typically written to specific locations in the transmission blocks which are established by the transmission standard and the transmission state. Data is generated taking into account the transmission standard and the transmission state with the return value or return values in the data generator 205. This data is digitally modulated to a high frequency signal by means of a transmitting device 206 and is transmitted in step S208 to the base station 250 as a device which is to be tested. In step S209, the transmitted signal with the return values is received in the receiving device 251 of the base station 250 and the return values are extracted from the transmission signal.

The return values which are randomly generated in the test device 200, simulate the return values of a mobile telephone and correspond to the parameter points are transmitted in the base station 250 to a decision device 252. In step S210, a decision relating to a transmission state, which is to be adjusted, is made in the decision device 252 on the basis of the return values and the decision rules 253 of the base station.

In step S211, a response signal which contains the transmission state which is to be adjusted is sent back to the test device 200 by means of the transmitting device 254. During the normal operation of the base station 250, this response signal is directed to a mobile radio device, so that it can understand the transmission state which is to be adjusted subsequently.

In step S212, the response signal is received in the receiving device 207 of the test device 200 and the transmission state which is contained therein and is to be adjusted is extracted. This extracted transmission state is transmitted to the evaluating device 220 where it is stored in a memory 221 together with the generated parameter point. The parameter point which produced the decision of the transmission state which is to be adjusted is therefore transmitted by the parameter generator 210 to the memory 211 of the evaluating device 210.

In step S214, the steps S206 to S213 are repeated until a stop condition is fulfilled. The stop condition can appear as described above. In each of these repetitions or loop passes, a new random parameter point is generated from the switching range 22 and the above-described steps are repeated for each new parameter point.

If the stop condition is finally fulfilled, then in step S215 all transmission states which are to be adjusted are statistically analyzed as a function of the parameter points of the switching range 22. To this end, all of the stored transmission states which are to be adjusted and their associated parameter points are transmitted from the memory 221 to the statistical evaluating device 222 and are possibly evaluated as described above.

Steps S206 to S213 are performed in step S216 for each switching point to be examined, until all of the switching points to be examined are evaluated.

The invention is not limited to the illustrated exemplified embodiments. On the contrary, individual features can also be combined with one another in an advantageous manner.

What is claimed is:

1. A method for testing a device for wireless communication in a radio network, consisting of the steps of:
    establishing a switching range in a parameter space which contains at least one parameter which describes a quality of a transmission and influences a transmission state which is to be adjusted, wherein the switching range contains at least one switching limit for transmission state to be adjusted;
    establishing a number of random parameter points in the switching range in a test device by implementing a probability distribution which is defined on the switching range;
    transmitting each parameter point in a respective signal to a device to be tested;
    transmitting back to the test device a respective response signal per received signal which contains the transmission state to be adjusted; and
    evaluating transmission states, which are to be adjusted, from response signals received by the test device.

2. The method as claimed in claim 1, wherein the parameter space contains, in addition to the quality of the transmission, a recommendation of a transmission state.

3. The method as claimed in claim 1, wherein the method tests a base station.

4. The method as claimed in claim 3, wherein the parameter values are possible return values of a mobile radio device to a base station.

5. The method as claimed in claim 1, wherein additional switching ranges are established and are evaluated according to claim 1.

6. The method as claimed in claim 1, wherein a switching limit which is located in an n-dimensional switching range forms an (n−1)-dimensional subspace of the switching range.

7. The method as claimed in claim 1, wherein the probability distribution, which is defined on the switching range, is a Gauss distribution in the one-dimensional parameter space and in the multi-dimensional parameter space the probability distribution defined on the switching range follows a Gauss distribution in the direction orthogonal to the switching limit and the transient directions thereof follow a uniform distribution.

8. The method as claimed in claim 1, wherein the transmission states which are transmitted by the response signal and which are to be adjusted or their recommendations are statistically evaluated.

9. The method as claimed in claim 8, wherein the resolution of the statistical evaluation is determined by the number of parameter points.

10. The method as claimed in claim 1, wherein the number of parameter points is determined by a stop criterion.

* * * * *